US009044048B2

(12) United States Patent
Steadwell et al.

(10) Patent No.: US 9,044,048 B2
(45) Date of Patent: Jun. 2, 2015

(54) SYSTEM AND PROCESS FOR APPLYING SEASONING TO A FOOD ITEM

(71) Applicant: Taco Bell, Corp., Irvine, CA (US)

(72) Inventors: Charles K. Steadwell, Carthage, NC (US); Steven R. Bordeaux, Sanford, NC (US); Rachelle Carandang, Dallas, TX (US)

(73) Assignee: Taco Bell, Corp., Irvine, CA (US)

( * ) Notice: Subject to any disclaimer, the term of this patent is extended or adjusted under 35 U.S.C. 154(b) by 32 days.

(21) Appl. No.: 13/692,754

(22) Filed: Dec. 3, 2012

(65) Prior Publication Data

US 2014/0057026 A1 Feb. 27, 2014

Related U.S. Application Data

(60) Provisional application No. 61/691,691, filed on Aug. 21, 2012.

(51) Int. Cl.
*A23P 1/08* (2006.01)
*B05C 19/04* (2006.01)
*A23L 1/00* (2006.01)

(52) U.S. Cl.
CPC ............... *A23P 1/082* (2013.01); *B05C 19/04* (2013.01); *A23L 1/005* (2013.01)

(58) Field of Classification Search
CPC .......... A23P 1/082; A23L 1/005; B05C 19/04
USPC .......... 118/13, 16, 24, 30, 308; 99/494, 450.1
See application file for complete search history.

(56) References Cited

U.S. PATENT DOCUMENTS

| 3,152,010 | A | | 10/1964 | Case | |
|---|---|---|---|---|---|
| 3,759,218 | A | * | 9/1973 | Korstvedt | ........................ 118/18 |
| 4,333,415 | A | * | 6/1982 | Miller et al. | ..................... 118/16 |
| 4,419,953 | A | | 12/1983 | Fowler | |
| 4,497,244 | A | | 2/1985 | Koppens | |
| 4,846,097 | A | | 7/1989 | Hansson | |
| 5,236,502 | A | | 8/1993 | Wadell | |
| 5,643,361 | A | * | 7/1997 | Wadell | ............................ 118/16 |
| 5,846,324 | A | * | 12/1998 | Marshall et al. | ................. 118/19 |
| 6,553,931 | B2 | | 4/2003 | Graham et al. | |

(Continued)

FOREIGN PATENT DOCUMENTS

JP 4461255 B2 5/2010
KR 101137914 B1 5/2012

*Primary Examiner* — Laura Edwards
(74) *Attorney, Agent, or Firm* — Knobbe, Martens, Olson & Bear, LLP.

(57) ABSTRACT

Systems and methods for applying seasoning or flavoring to food items or products, for example, taco shells, are provided. A seasoning system can include a seasoning hopper or other storage container, a scarf plate, a scalping screen, a conveyor system, and a collection bin. The scalping screen can help reduce clumps in seasoning that falls onto the food items to allow for more even and consistent seasoning distribution. The conveyor system can include a mechanism for tilting or pivoting the food items to allow for application of seasoning to multiple surfaces of the food item as the food items are conveyed under the seasoning delivery system. A method for applying seasoning to food items can include adjusting process parameters such as presentation angle of the food items, throughput, seasoning flow rate, etc. to adapt to varying conditions such as temperature, humidity, and seasoning coverage.

8 Claims, 12 Drawing Sheets

(56) References Cited

U.S. PATENT DOCUMENTS

| | | |
|---|---|---|
| 6,588,363 B1 | 7/2003 | Bruke et al. |
| 6,619,226 B2 | 9/2003 | Rooke |
| 7,174,846 B2 | 2/2007 | Zeegers et al. |
| 7,841,294 B2 | 11/2010 | Meier et al. |
| 8,007,848 B2 | 8/2011 | Garrison et al. |
| 2002/0022072 A1 | 2/2002 | Burke et al. |

* cited by examiner

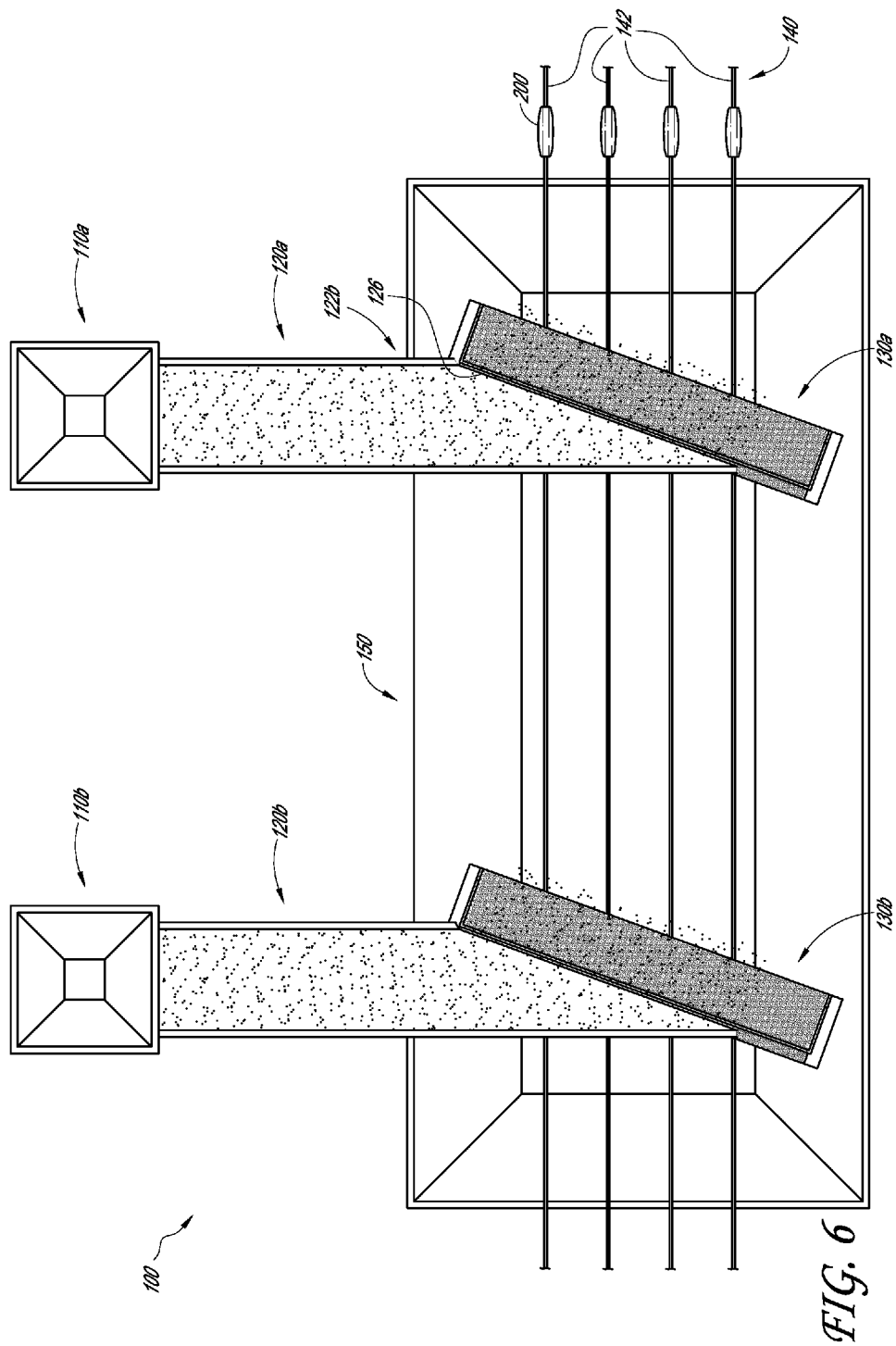

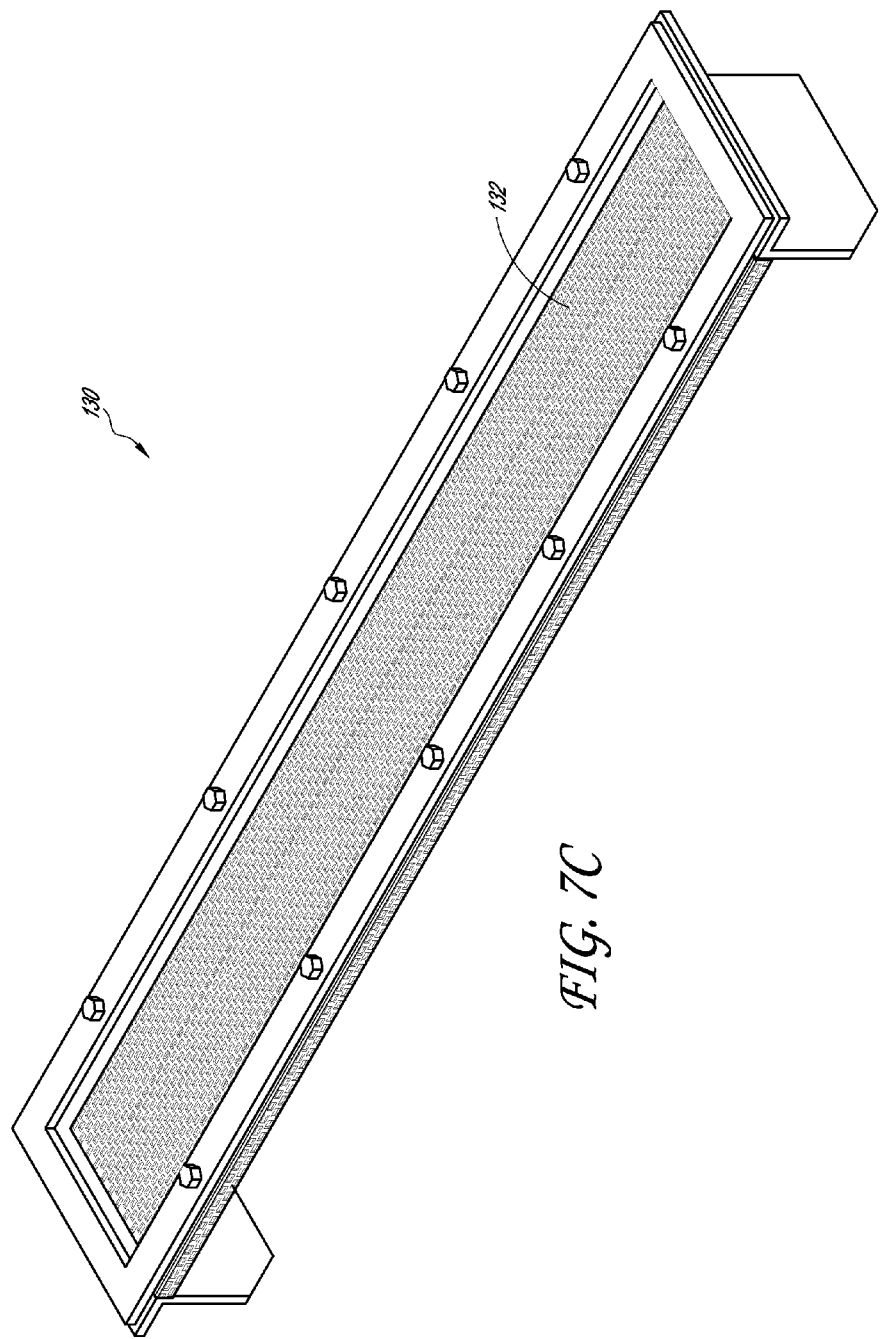

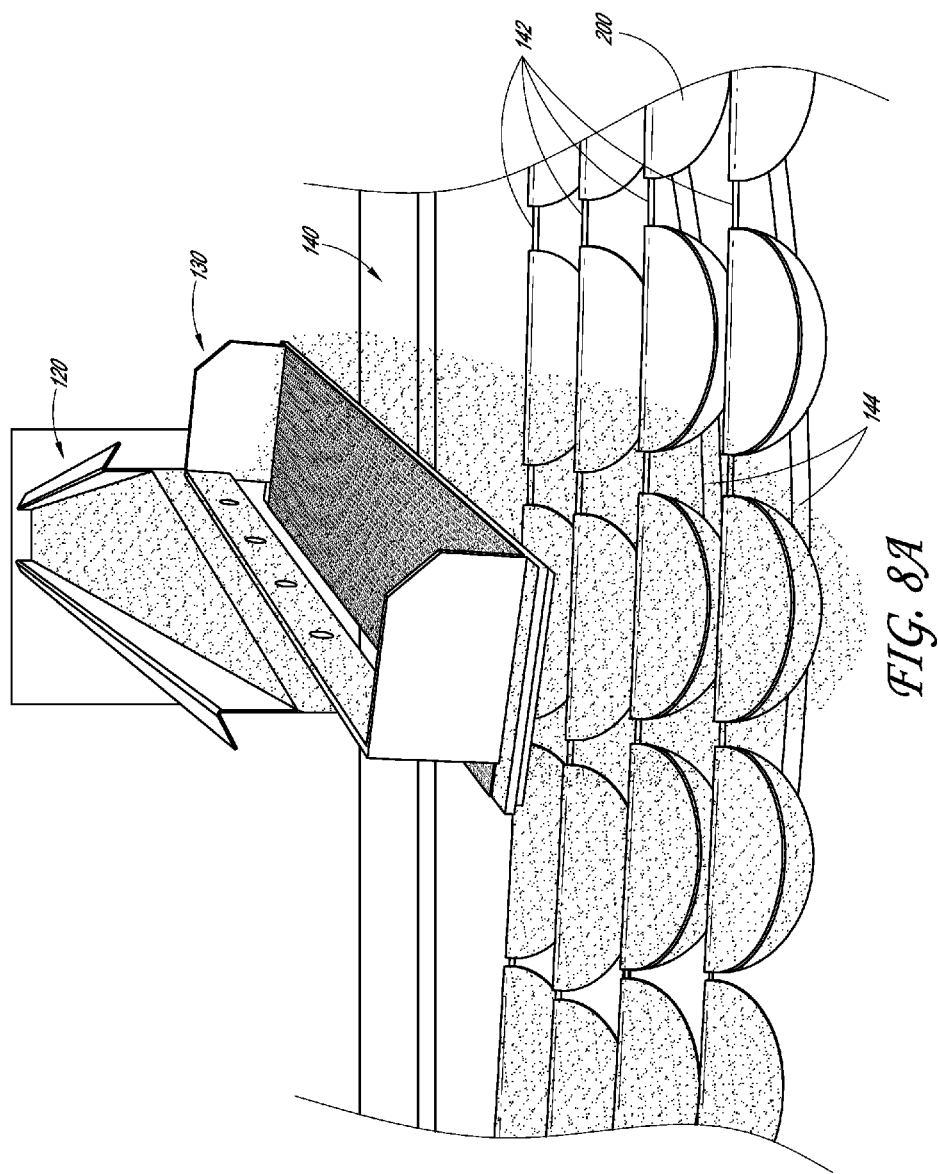

SYSTEM AND PROCESS FOR APPLYING SEASONING TO A FOOD ITEM

CROSS-REFERENCE TO RELATED APPLICATIONS

This application claims priority benefit of U.S. Provisional Patent Application No. 61/691,691, filed Aug. 21, 2012, the entirety of which is hereby incorporated by reference and should be considered a part of this specification.

BACKGROUND

1. Field

The present disclosure relates generally to a system and method for applying seasoning to a food item, and more particularly, to a system and method for applying seasoning to multiple surfaces of a food item and adjusting system parameters to achieve a desired distribution of seasoning.

2. Description of the Related Art

Various technologies exist for applying seasoning or flavoring to a food item. FIGS. 1-4 illustrate example pieces of equipment for use in applying seasoning. For example, seasoning powder can be delivered from a seasoning hopper 110 or other storage container and distributed over a food item in a coating drum 112 or blender or on a conveyor belt. In some systems, a scarf plate 120 is used to help improve product coverage and distribute seasoning more evenly. As shown in FIG. 3, an example scarf plate 120 can include an inclined tray 122 having side walls 124, a bias-cut downstream edge 126, and a weir plate 128. A scarf plate 120 can be coupled to a seasoning hopper 110, for example, as shown in FIG. 4. In use, the hopper 100 deposits seasoning onto an upstream portion of the tray 122, and the scarf plate 120 is vibrated to help move the seasoning down the tray. The weir plate 128 can help control the flow of seasoning down the tray 122. The seasoning falls off the tray 122 at the bias-cut edge 126, creating a curtain of seasoning that falls onto the food items as they tumble in a drum 112 or move along a conveyor.

SUMMARY

The systems and methods described herein provide for the application of seasoning or flavoring to food items or products, for example, taco shells. The systems and methods described herein can further advantageously include features to help reduce clumping of the seasoning and to apply seasoning to multiple surfaces of the food item as the food items are conveyed automatically under the seasoning delivery system.

In some embodiments, a seasoning system for applying seasoning to a food item includes at least one scarf plate extending between a proximal end and a distal end and having a bias-cut edge at the distal end, at least one scalping screen, a conveyor system, and a collection bin. The scalping screen can be attached to the scarf plate proximate the distal end and configured to deliver a curtain of seasoning from the scarf plate therethrough onto one or more food items being conveyed under the scalping screen. The scalping screen can include a screened base, two side walls attached to the screened base, a rear wall attached to the side walls and defining a gap between a bottom of the rear wall and a top surface of the screened base, and an open front edge along a side of the scalping screen opposite the rear wall. The scalping screen is configured to reduce clumps in seasoning falling from the at least one scarf plate through the scalping screen. The conveyor system can be configured to convey the one or more food items along a path under the scalping screen to thereby allow the food items to receive the seasoning thereon. The collection bin can be disposed below the conveyor system and generally aligned with the scalping screen, and can be configured to collect excess seasoning that falls over the one or more food items.

In some embodiments, a seasoning system for applying seasoning to food items includes at least one scarf plate extending between a proximal end and a distal end and having a bias-cut edge at the distal end, at least one scalping screen attached to the at least one scarf plate proximate the distal end and configured to deliver a curtain of seasoning from the scarf plate therethrough onto one or more food items being conveyed under the scalping screen, a conveyor system, and a collection bin. The conveyor system includes four lines extending beneath the scalping screen. A plurality of food items hang from the four lines, and the lines convey the food items through the curtain of seasoning. The conveyor system also includes one or more pivoting mechanisms configured to tilt the food items away from a vertical axis to increase the presentation surface area of the food items to the curtain of seasoning falling from the at least one scalping screen. The collection bin can be disposed below the conveyor system and generally aligned with the scalping screen, and can be configured to collect excess seasoning that falls over the one or more food items.

In some embodiments, a method for applying seasoning to food items includes supplying seasoning to a hopper portion of a seasoner, operating the seasoner so that the seasoning is deposited from the hopper onto a scarf plate and travels down the scarf plate and through or off of a scalping screen, and operating a conveyor system portion of the seasoner to convey the food items through a curtain of seasoning falling off or through the scalping screen. The conveyor system can include one or more pivoting mechanisms configured to tilt the food items away from vertical to increase the presentation surface area of the food items to the curtain of seasoning falling from the at least one scalping screen. The method can further include adjusting operational parameters to improve seasoning distribution and coverage of the food items.

BRIEF DESCRIPTION OF THE DRAWINGS

FIG. 6 is a schematic top view of an example embodiment of a seasoning system;

FIG. 7C is a perspective front and bottom view of the scalping screen of FIG. 7A; and FIGS. 8A-8B are perspective side views of a portion of a seasoning system for applying seasoning to taco shells.

DETAILED DESCRIPTION

Figure 1:
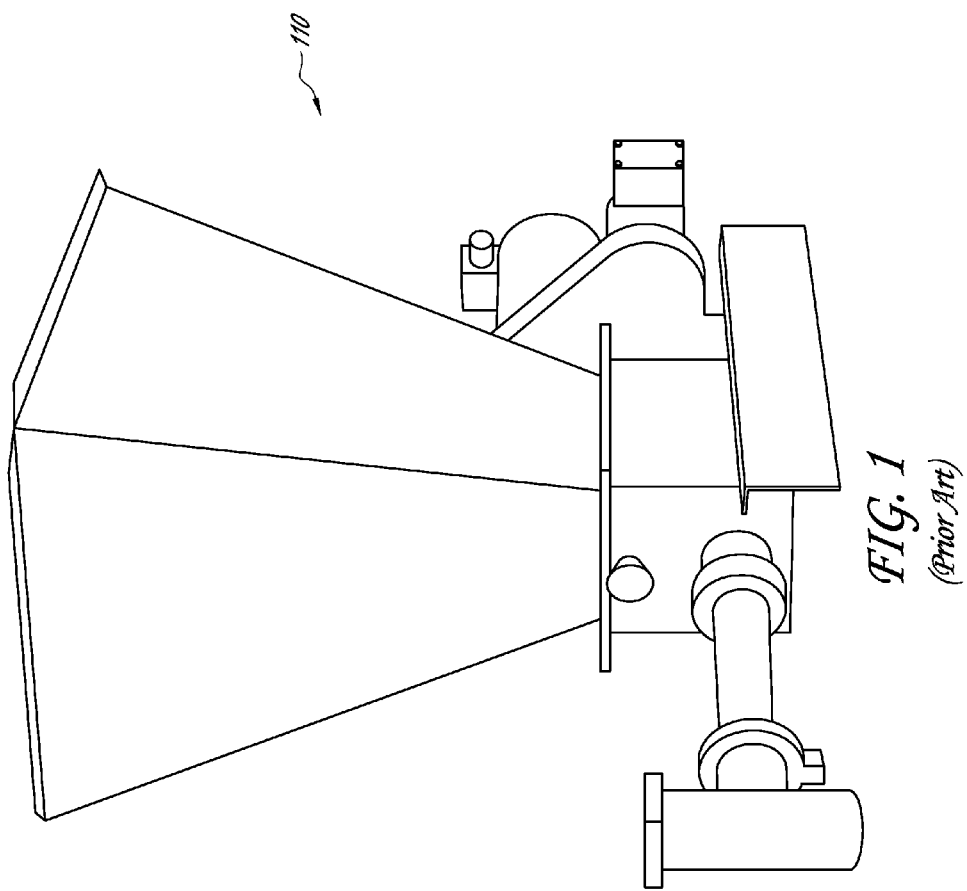
FIG. 1 illustrates a conventional seasoning hopper.
Figure 2:
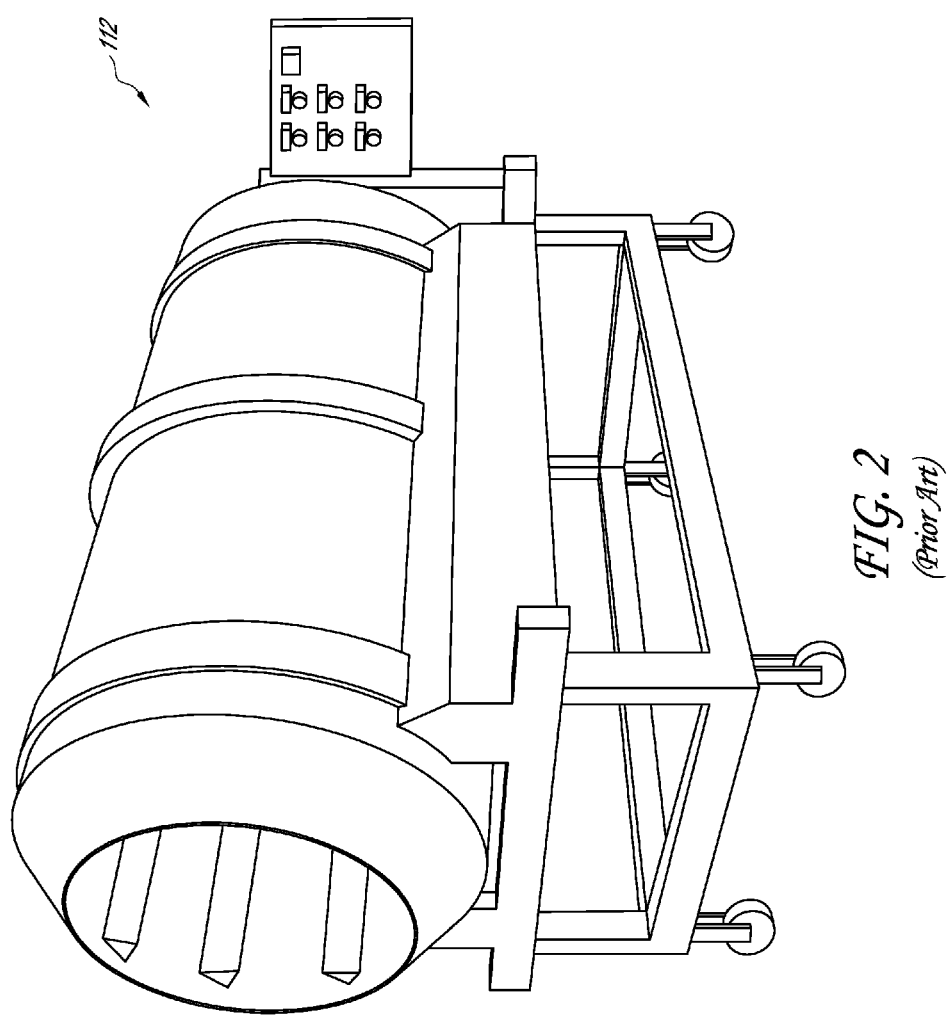
FIG. 2 illustrates a conventional seasoning drum.
Figure 3:
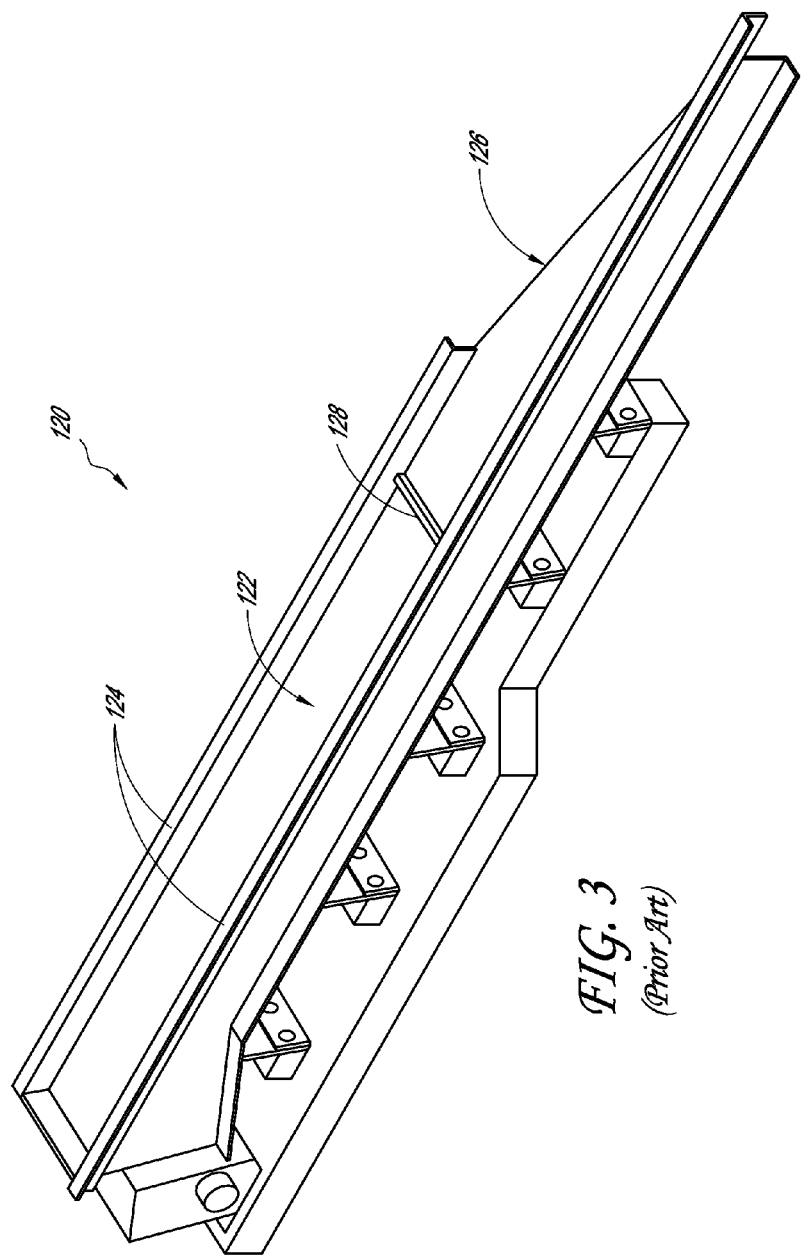
FIG. 3 illustrates a conventional scarf plate.
Figure 4:
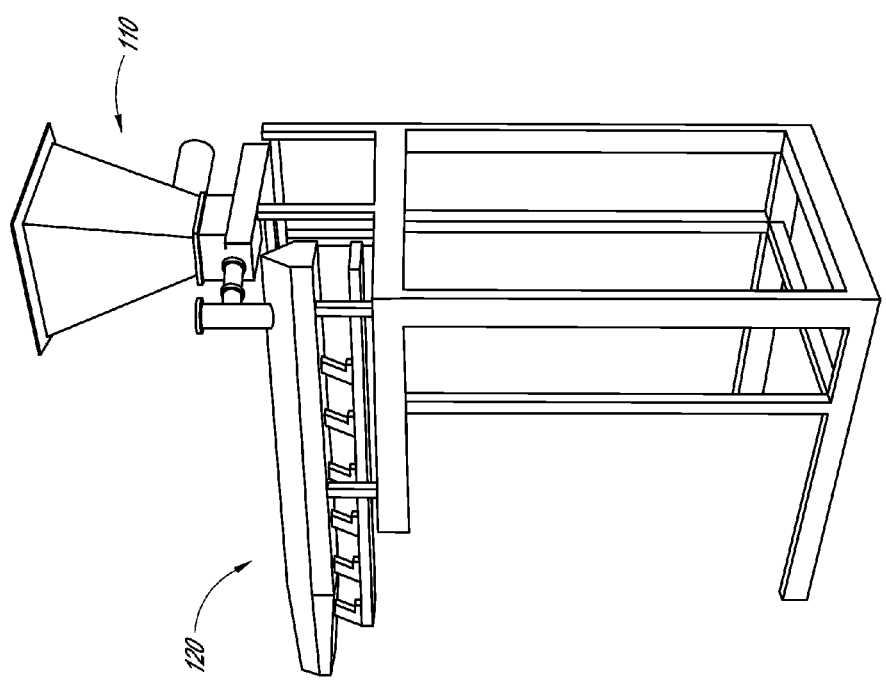
FIG. 4 illustrates a conventional hopper and scarf plate assembly.
Figure 5:
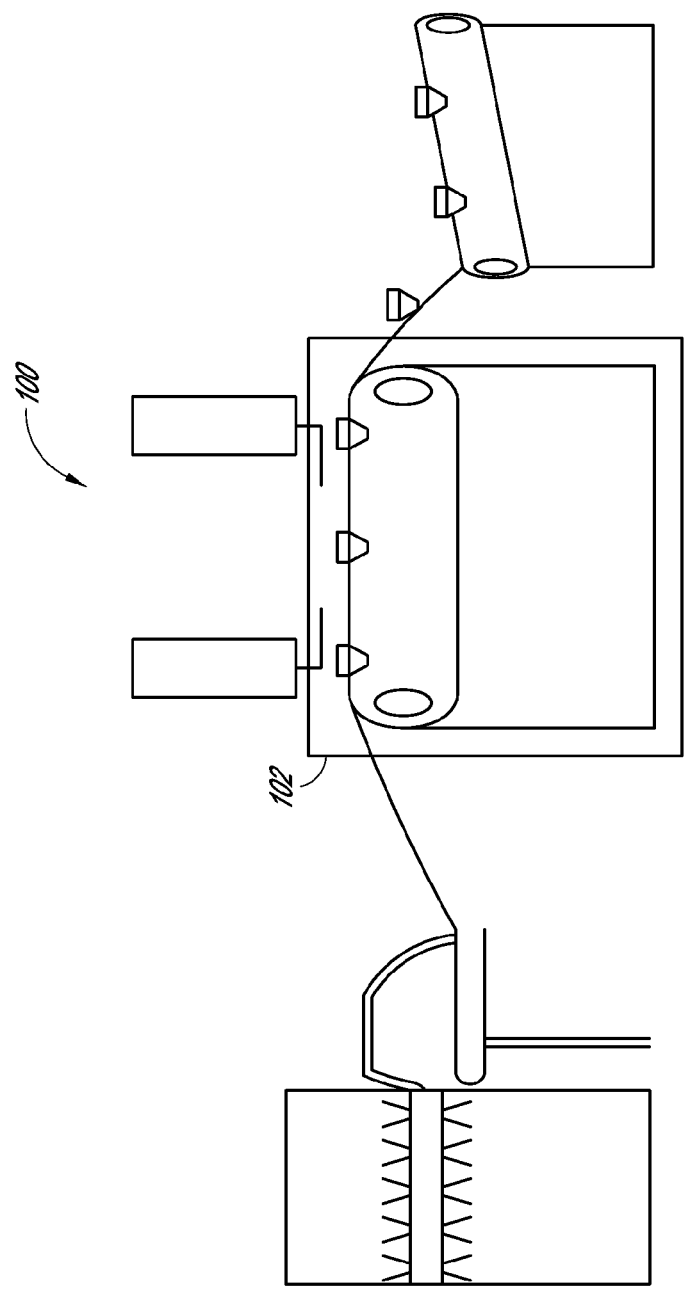
FIG. 5 schematically illustrates a portion of a system and process for seasoning a food item.

The systems and processes described herein can be used to apply a substance, such as a flavoring or seasoning, to a food item. In some embodiments, a system or process for applying a substance to a food item is configured to apply a flavoring or seasoning to a taco shell, as schematically shown in FIG. 5. However, the system or process can be used for applying a substance (e.g., seasoning, flavoring, condiment) to food items other than taco shells. Taco shells can be cooked in a deep fryer, and when removed from the fryer, the taco shells are coated with hot oil (e.g., separately coated with oil following removal from the deep fryer, or coated with oil as a result of their placement in the fryer). The taco shells covered in oil can be conveyed to and through a booth or enclosure housing a seasoning machine or seasoner. In some cases, shells exiting the fryer can have a temperature of about 300° F. However, some seasonings are preferably applied to food products having a temperature in the range of about 170° F. to about 205° F. Therefore, the seasoner can be spaced from the fryer by a distance selected to allow the taco shells and oil to cool to a desired temperature before passing through the seasoner. In some embodiments, air (e.g., chilled air) can be directed over the taco shells between the fryer and the entrance of the seasoner to further cool the shells as needed to have the shells within the desired temperature range within the seasoner. Within the booth, a curtain of seasoning is poured from a source onto the shells. The hot oil acts as an adhesive that facilitates the adherence of the seasoning onto one or more surfaces of the shells. In some embodiments, the orientation of the shells can be changed as they progress through the booth (e.g., as the taco shells are automatically conveyed through the booth). This can advantageously allow multiple surfaces of the shells to be covered with the seasoning. In some embodiments, the seasoning can be recycled within the booth. For example, seasoning that does not stick to the shells can be collected in a container at the bottom of the booth and transferred, e.g., manually or mechanically, back to the seasoning source to be re-poured onto subsequent shells.

An example embodiment of a seasoner 100 for applying seasoning to taco shells (or other food products) can include a seasoning hopper 110 or other storage container, a scarf plate 120, a scalping screen 130, a conveyor system 140, and a collection bin 150 as shown in FIG. 6. In one embodiment, at least a portion of the scarf plate 120, scalping screen 130, conveyor system 140 and collection bin 150 are disposed in a housing 102. In the illustrated embodiment, the seasoner 100 includes two seasoning hoppers 110a, 110b, which deliver seasoning onto corresponding scarf plates 120a, 120b, which in turn deliver seasoning through corresponding scalping screens 130a, 130b and onto taco shells at two locations within the seasoner 100. As discussed herein, the hopper 110 deposits seasoning onto an upstream end 122a of the scarf plate 120, which, in one embodiment, can be elevated relative to a downstream end 122b of the scarf plate 120. The incline and vibration of the scarf plate 120 causes the seasoning to move down the scarf plate 120 and fall off the bias-cute edge 126.

Figure 7A:
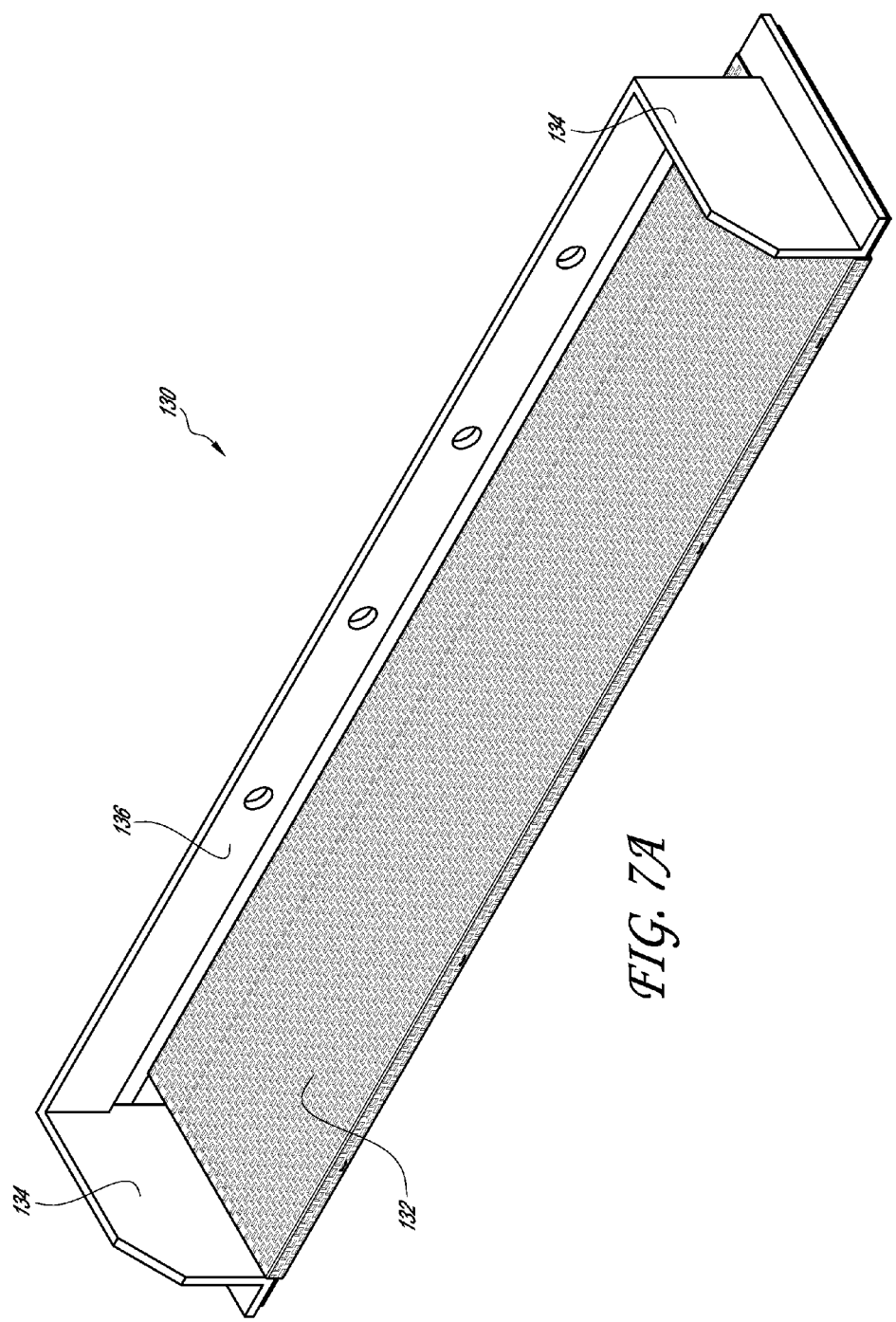
FIG. 7A is a perspective front and top view of an example embodiment of a scalping screen used with a seasoning system.
Figure 7B:
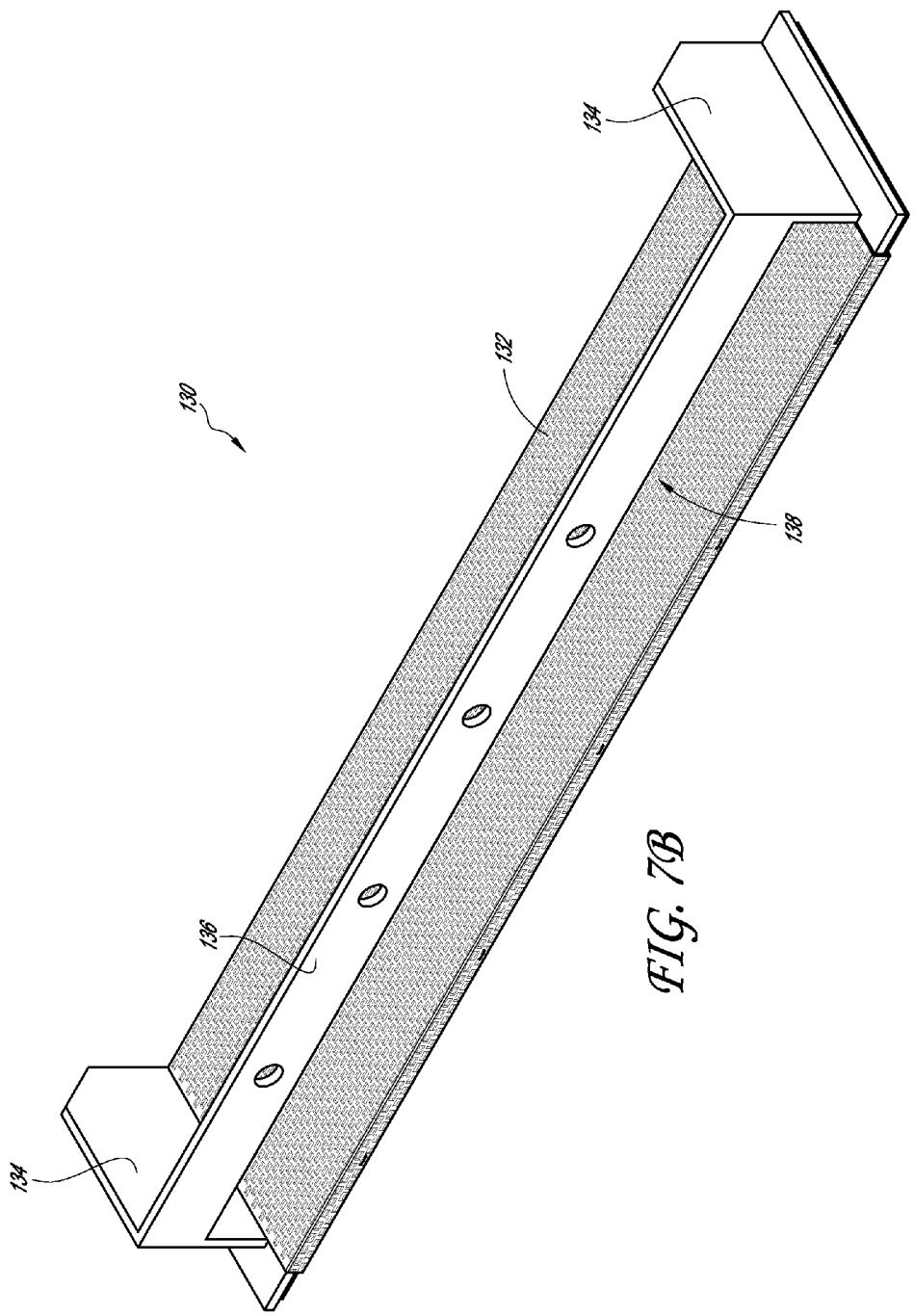
FIG. 7B is a perspective rear and top view of the scalping screen in FIG. 7A.

In the illustrated embodiment, a scalping screen 130 is coupled to the downstream end 122b of the scarf plate 120 along the bias-cut edge 126. In some embodiments, for example as shown in FIGS. 7A-7C, a scalping screen 130 generally includes a screened base 132, side walls 134, and a rear wall 136. The rear wall 136 can be coupled to the scarf plate 120, for example, with one or more fasteners (e.g., bolts that extend through holes in the rear wall 136). In use, seasoning falls off the bias-cut edge 126 of the scarf plate 120 onto the scalping screen 130. The screened base 132 can advantageously help reduce clumps in the seasoning that falls onto the taco shells to allow for more even and consistent distribution of the seasoning onto the taco shells. In some embodiments, the rear wall 136 of the scalping screen 130 does not extend all the way to the screened base 132 so that there is a gap 138 between a bottom of the rear wall 136 and the screened base 132. The scalping screen 130 can also have an open front edge (e.g., at the side of the scalping screen 130 opposite the rear wall 136). The gap 138 and open front edge can allow seasoning to fall off the front and rear edges of the scalping screen 130 to advantageously inhibit buildup of seasoning and clogging of the scalping screen 130, thereby allowing for seasoning to be distributed over the taco shells in a manner (e.g., continuous manner) that provides a generally even coating of seasoning on one or more surfaces of the taco shells.

As shown in FIGS. 6 and 8A-9, the conveying system 140 can include four lines 142. However, in other embodiments, the conveying system 140 can have fewer (e.g., 1, 2, or 3) or more (e.g., 5, 6, etc.) lines 142. Each line can include a continuous loop of linear material (e.g., cord, wire, etc.) driven, for example, by two pulleys, as schematically shown in FIG. 5. In some embodiments, the lines 142 can be configured to receive taco shells 200 from the fryer, for example via a transport line running between the fryer and seasoner. In other embodiments, the conveying system 140 can covey food items other than taco shells. The taco shells 200 are draped over the lines 142 so that an interior surface of a base of the shells 200 rests on the line 142 and the sides of the shells 200 hang down vertically below the lines 142. The lines 142 run under the scalping screen 130 to pass the taco shells 200 through the seasoning falling (e.g., falling as a curtain of seasoning under force of gravity) from (e.g., through) the scalping screen 130. In some embodiments, the lines 142 can be spaced so that there is between about 3 inches and about 5 inches between adjacent lines 142. In one embodiment, the spacing between adjacent lines 142 can be about 3.5 inches. Advantageously, the spacing between the lines 142 allows the taco shells on adjacent lines to be pivoted (as described further below) generally at the same time while they are conveyed under the curtain of falling seasoning without taco shells on adjacent lines touching, thereby maintaining the integrity of the taco shells during the seasoning operation.

In some embodiments, the scarf plate 120 and/or scalping screen 130 are selected or designed to extend over all four lines 142. For example, the bias-cut edge 126 of the scarf plate can have a length of between about 24-48 inches, for example about 36 inches. The dimensions of the scarf plate 120 and/or spacing between lines 142 can be selected or designed to help improve the uniformity of seasoning distribution on the shells 200. For example, in some embodiments, seasoning distribution measured within about 2 in. to about 3 in. from the ends of the scarf plate 120 edge 136 can be about 30% less than seasoning distribution measured near the center of the scarf plate 120 edge 136.

Figure 8B:
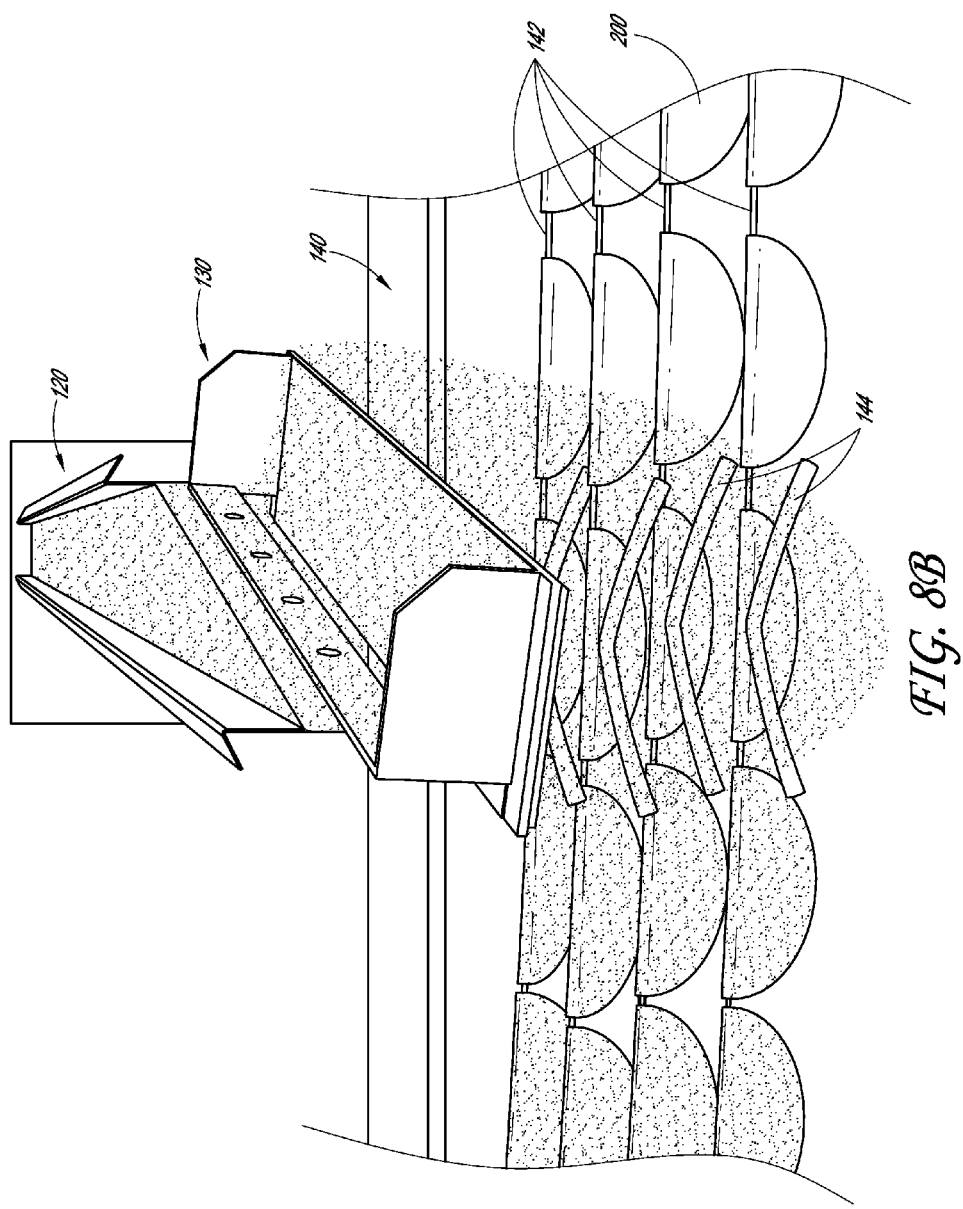
Figure 9:
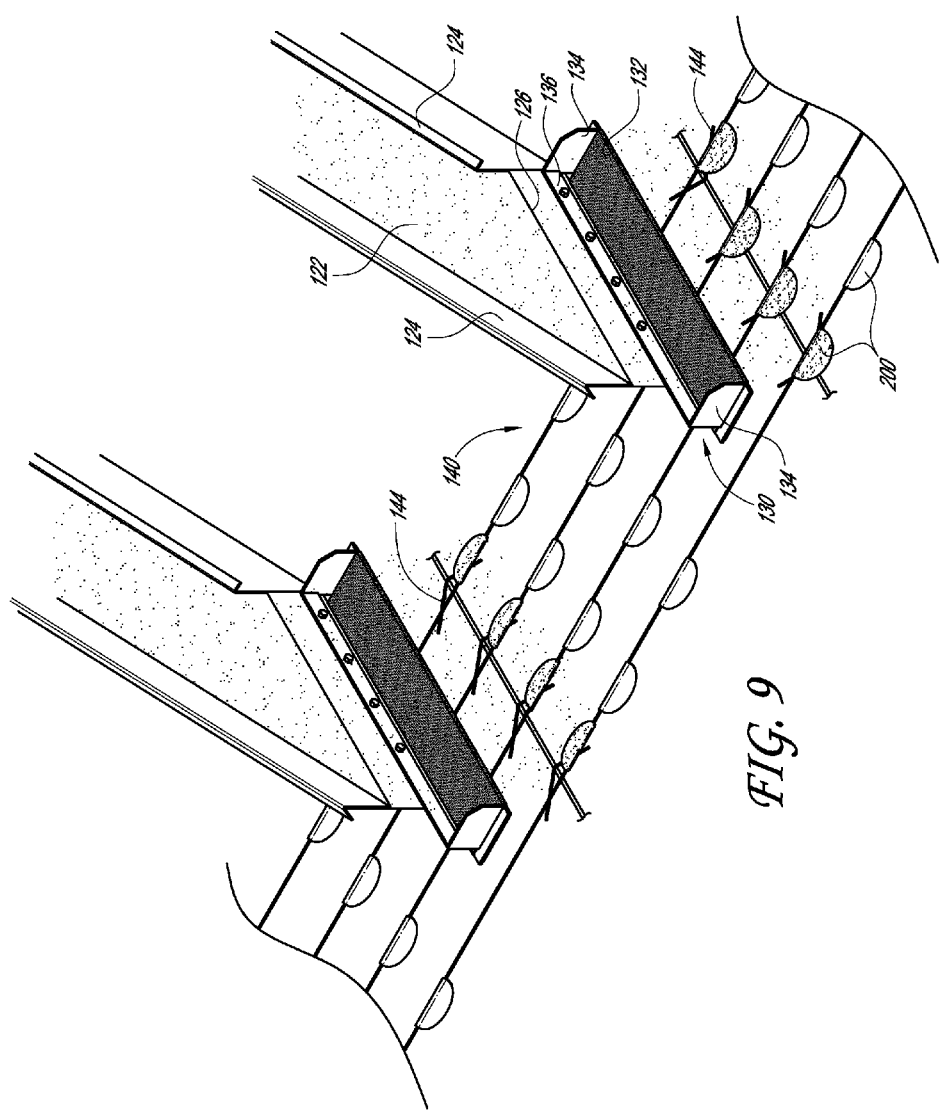
FIG. 9 is a schematic perspective top and side view of a portion of the seasoning system in FIGS. 8A-8B.

In some embodiments, the conveying system 140 includes one or more pivoting mechanisms 144 configured to tilt or pivot the taco shells 200 at one or more locations as the taco shells 200 are conveyed through the seasoner 100. In the illustrated embodiment, the pivoting mechanisms 144 are metal bars that bear against the taco shells as the shells are conveyed past the bars. However, in other embodiments, other suitable mechanisms (e.g., angled or inclined panels) can be used to tilt or pivot the taco shells 200 and need not be bars. In one embodiment, the pivoting mechanisms 144 can be generally flattened V or chevron shaped bars as shown in FIGS. 8A-9, although other configurations are possible. The pivoting mechanisms 144 are generally located beneath the lines 142 under the scalping screen 130. In use, the pivoting mechanisms 144 are configured to tilt the taco shells away from vertical to present a side surface of the taco shell 200 to the curtain of seasoning, thereby allowing seasoning to better coat the sides of the shells. In some embodiments, where the pivoting mechanisms 144 are bars, the bars 144 are positioned so that a point of each bar 144 is located on one side of the lines 142, while the ends of each bar 144 are located on the other side of the lines 142. For example, with reference to FIG. 8A where the right side of the figure is upstream, when viewing the lines 142 from upstream toward downstream, the points of the bars 144 are to the left of the lines 142 and the ends of the bars 144 are to the right of the lines 142. In one embodiment, the bars 144 extend along a plane that is at an angle (e.g., inclined) relative to a vertical axis. In another embodiment, the bars 144 extend along a plane that is generally perpendicular to the vertical axis. With continued reference to FIG. 8A, as the lines 142 move shells 200 through the seasoner 100, right sides of the shells 200 contact left sides of the ends of the bars 144. The bars 144 guide and tilt the shells 200 to the left (e.g., away from vertical when viewing the lines from the upstream end toward the downstream end of the lines) to allow for improved coating of the left sides of the shells 200 and then allow the taco shells 200 to move back to hanging generally vertically.

In some embodiments, the seasoner 100 can include two hopper 100, scarf plate 120, and scalping screen 130 assemblies, for example, as shown in FIG. 6. A second set of pivoting mechanisms 144 can be located beneath the lines 142 under the second scalping screen 130b. As shown in FIGS. 8B and 9, where the pivoting mechanisms 144 are bars, the orientation of the second set of bars 144 can be reversed, so that the points are to the right of the lines 142 and the ends are to the left when viewed from the upstream end toward the downstream end. With continued reference to FIG. 8B, the left sides of the shells 200 therefore contact the right side of the bars 144 to tilt the shells 200 to the right and allow for improved coating of the right sides of the shells 200. The use of two scarf plates 120 and scalping screens 130 can therefore allow for improved coating of both sides of the shells 200 with seasoning. The tilt angle of the shells 200 from vertical can be adjusted, for example, by adjusting the position of the pivoting mechanisms 144 in a direction generally orthogonal to the conveying axis. For example, where the pivoting mechanisms 144 are bars, the points (or edges) of the bars 144 can be moved closer to or farther from the lines 142, where such adjustments can be made manually to the bars 144. In another embodiment, the adjustments can be made automatically via a hydraulic, pneumatic or motor (e.g., electric motor) driven system that operates the positioning of the bars 144.

The quality of some seasonings and the amount of seasoning that adheres to the food item can be affected by factors such as temperature and humidity. For example, some seasonings are preferably kept at a temperature of about 70° F. and a relative humidity of about 30%. In some embodiments of the systems and processes described herein, various process parameters can be adjusted to adapt to and optimize or improve seasoning coverage in different environmental conditions, e.g., temperature, humidity, etc. For example, the tilt angle of the shells 200 can be adjusted based on, for example, temperature, humidity, and/or a measurement of percent seasoning pick-up. In some embodiments, the tilt angle (e.g., when the shells 200 are tilted or pivoted to the left and right relative to vertical) can range between about 30° to about 70° relative to a vertical axis. For another example, a flow rate of seasoning from the hopper and/or along the scarf plate and/or a throughput of the conveyor lines 142 can be adjusted to optimize seasoning coverage. In some embodiments, the seasoning flow rate can be up to about 1.48 lbs/min for a 36 in. scarf plate, though in other embodiments, the flow rate can be higher or lower than this. In some embodiments, the throughput of the conveyor lines 142 can correspond to about 85 percent of the motor capacity. However, in other embodiments, the throughput can be lower or higher than this. In one embodiment, they taco shells 200 can take about 6-7 seconds to be conveyed from the beginning of the seasoner 100 to the end of the seasoner 100. However, in other embodiments, the taco shells 200 can be conveyed through the seasoner 100 faster (e.g., take less time) or slower (e.g., take more time) than this.

In some embodiments, a rate of seasoning is selected so as to deliver an over-seasoning of 5-7 times the amount of seasoning wanted on the shells 200. Seasoning that falls from the scarf plate 120 and scalping screen 130 but that does not adhere to the taco shells 200 can be collected in the collection bin 150. Periodically or as needed, seasoning accumulated in the collection bin 150 can be moved, e.g., manually or automatically, back to the hopper 110 to be recycled. In some embodiments, excess seasoning can be recycled 2-3 times without a significant reduction in seasoning quality or taco shell 200 coverage. An over-seasoning rate in the range of 5-7 times the seasoning adhered to the shells 200 can be more efficient and less wasteful than an over-seasoning rate of, for example, about 10 times the desired seasoning. Advantageously, the seasoning system described herein allows for the taco shells to be coated with seasoning in an efficient manner, so that it is not necessary to shake or otherwise remove excess seasoning from the shells 200 once they exit the seasoner 100. Rather, once the shells 200 exit the seasoner 100, they can be moved on to packaging for shipment.

In some embodiments, the amount of seasoning adhered to the taco shells can be determined using a measurement of a seasoning component, for example, salt, in a sample seasoned taco shell. If the amount of the seasoning component, such as salt, in the seasoning formula is known, a conversion chart can be used to correlate the percentage of salt in the seasoned product to a percentage of seasoning coverage. In some embodiments, the presentation angle of the shells 200 and/or other process parameters (e.g. delivery flow rate of seasoning) can be adjusted to achieve a certain percentage of salt pickup, which corresponds to a desired percentage of seasoning coverage. In one embodiment, the desired percentage of salt in the seasoned product can be in the range of about 0.75 to about 0.92, which can correspond to a seasoning percentage of about 4.5 to about 5.5, although these percentages can be higher or lower than these ranges in other embodiments. Various process parameters can be adjusted as needed based on the determination of seasoning coverage. For example, if the seasoning coverage is less than desired, the presentation angle of the taco shells 200 and/or a seasoning flow rate can be increased. Conversely, if the seasoning coverage is greater than desired, the presentation angle of the shells 200 and/or seasoning flow rate can be decreased. In some embodiments, system parameters such as throughput, presentation angle of the shells, flow rate, etc. can be adjusted to minimize a blotchy or spotty appearance of seasoning coating on the shell surface. Color testing can be used to more objectively evaluate the quality and consistency of the finished seasoned products.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. For example, the disclosed embodiments of the seasoner 100 can be used to coat food products other than taco shells with other seasonings or condiments. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A scalping screen configured to be attached to and receive seasoning from a distal end of a scarf plate, the scalping screen comprising:
    a screened base;
    two side walls attached to the screened base; and
    a rear wall attached to the side walls and defining a gap between a bottom of the rear wall and a top surface of the screened base, the scalping screen having an open front edge along a side of the scalping screen opposite the rear wall;
    wherein the scalping screen is configured to deliver a curtain of seasoning therethrough onto one or more food items being conveyed under the scalping screen and reduce clumps in seasoning falling through the scalping screen, and wherein the gap allows seasoning to fall off of both the front edge and a rear edge of the scalping screen to inhibit clogging in of the scalping screen.

2. A seasoning system for applying seasoning to a food item, the seasoning system comprising:
    a scalping screen configured to be attached to and receive seasoning from a distal end of a scarf plate, the scalping screen comprising:
        a screened base;
        two side walls attached to the screened base; and
        a rear wall attached to the side walls and defining a gap between a bottom of the rear wall and a top surface of the screened base, the scalping screen having an open front edge along a side of the scalping screen opposite the rear wall;
    wherein the scalping screen is configured to deliver a curtain of seasoning onto one or more food items being conveyed under the scalping screen and reduce clumps in seasoning falling through the scalping screen, and wherein the gap allows seasoning to fall off of both the front edge and a rear edge of the scalping screen to inhibit clogging of the scalping screen.

3. The seasoning system of claim 2, further comprising a conveyor system configured to convey the one or more food items along a path under the scalping screen to thereby allow the food items to receive the seasoning thereon, the conveyor system comprising four conveyor lines configured to convey a plurality of rows of food items under the scalping screen to allow the food items to receive seasoning thereon, wherein each of the four conveyor lines is spaced about 3.5 inches from an adjacent conveyor line.

4. The seasoning system of claim 2, further comprising a conveyor system configured to convey the one or more food items along a path under the scalping screen to thereby allow the food items to receive the seasoning thereon, the conveyor system comprising a mechanism for adjusting a tilt angle of the food items as they pass under the scalping screen to an angle in the range of about 30° to about 70° to adjust a presentation surface area of the food items, thereby improving seasoning distribution and coverage on the food items.

5. The seasoning system of claim 2, further comprising a conveyor system configured to convey the one or more food items along a path under the scalping screen to thereby allow the food items to receive the seasoning thereon, the conveyor system comprising a mechanism for adjusting a tilt angle of the food items to adjust for environmental temperature and humidity conditions.

6. The seasoning system of claim 2, wherein the distal end of the scarf plate comprises a bias-cut edge and the scalping screen is configured to be attached to the scarf plate along the bias-cut edge.

7. The seasoning system of claim 2, wherein the rear wall is configured to be attached to the scarf plate.

8. The seasoning system of claim 3, wherein the scalping screen extends across the conveyor lines at an angle relative to an axis perpendicular to the conveyor lines.

* * * * *